United States Patent
Sekimoto (10) Patent No.: US 10,163,222 B2
(45) Date of Patent: Dec. 25, 2018

(54) IMAGE CAPTURING APPARATUS, TRACKING DEVICE, CONTROL METHOD, AND STORAGE MEDIUM

(71) Applicant: CANON KABUSHIKI KAISHA, Tokyo (JP)

(72) Inventor: Ryota Sekimoto, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 144 days.

(21) Appl. No.: 15/426,877

(22) Filed: Feb. 7, 2017

(65) Prior Publication Data
US 2017/0228887 A1 Aug. 10, 2017

(30) Foreign Application Priority Data
Feb. 10, 2016 (JP) .................. 2016-023892

(51) Int. Cl.
*H04N 5/00* (2011.01)
*G06T 7/70* (2017.01)
*H04N 5/232* (2006.01)
*G06T 7/50* (2017.01)

(52) U.S. Cl.
CPC .............. *G06T 7/70* (2017.01); *G06T 7/50* (2017.01); *H04N 5/23212* (2013.01); *H04N 5/23216* (2013.01); *G06T 2207/30241* (2013.01)

(58) Field of Classification Search
CPC ....... G06F 3/01; G06F 3/017; G06K 9/00382; G06K 9/00355
See application file for complete search history.

(56) References Cited

U.S. PATENT DOCUMENTS

| | | | | |
|---|---|---|---|---|
| 5,444,791 A | * | 8/1995 | Kamada | G06K 9/00335 348/155 |
| 5,594,469 A | * | 1/1997 | Freeman | G05B 19/106 345/157 |
| 5,617,312 A | * | 4/1997 | Iura | G06F 3/011 345/157 |
| 5,808,678 A | * | 9/1998 | Sakaegi | H04N 5/23293 348/333.03 |
| 5,991,428 A | * | 11/1999 | Taniguchi | G06K 9/3241 348/155 |
| 6,191,773 B1 | * | 2/2001 | Maruno | G06F 3/017 345/156 |
| 6,498,628 B2 | * | 12/2002 | Iwamura | G08C 23/00 345/157 |

(Continued)

FOREIGN PATENT DOCUMENTS

JP 2013-143578 A 7/2013

*Primary Examiner* — Frank F Huang
(74) *Attorney, Agent, or Firm* — Canon U.S.A., Inc. IP Division (57) ABSTRACT

An image capturing apparatus according to an exemplary embodiment includes a touch panel unit that detects a touch operation. When a user touches the touch panel unit while the image capturing apparatus is in a mode of tracking a predetermined object, a system control unit sets an object search area for searching for the predetermined object. The system control unit sets the tracking area based on a difference between information corresponding to a distance to an object calculated by an image calculation unit for the object search area and information corresponding to a distance to an object that has previously been tracked.

20 Claims, 7 Drawing Sheets

(56) References Cited

U.S. PATENT DOCUMENTS

| | | | | | |
|---|---|---|---|---|---|
| 6,501,515 B1* | 12/2002 | Iwamura | G08C 23/00 345/157 |
| 7,639,233 B2* | 12/2009 | Marks | G06F 3/0304 345/156 |
| 7,828,659 B2* | 11/2010 | Wada | A63F 13/00 345/156 |
| 8,035,624 B2* | 10/2011 | Bell | G06F 3/0428 345/175 |
| 8,115,877 B2* | 2/2012 | Blatchley | G06F 1/1601 345/158 |
| 8,144,121 B2* | 3/2012 | Kitaura | G06F 3/0304 178/18.01 |
| 8,199,108 B2* | 6/2012 | Bell | G06F 3/011 345/156 |
| 8,203,601 B2* | 6/2012 | Kida | G06F 3/017 348/135 |
| 8,228,305 B2* | 7/2012 | Pryor | G06F 3/011 178/18.01 |
| 8,230,367 B2* | 7/2012 | Bell | G06F 3/011 715/863 |
| 8,253,746 B2* | 8/2012 | Geisner | G06F 3/011 345/474 |
| 8,300,042 B2* | 10/2012 | Bell | G06F 3/011 345/156 |
| 8,340,432 B2* | 12/2012 | Mathe | G06K 9/00201 382/190 |
| 8,368,819 B2* | 2/2013 | Lee | H04N 21/42204 348/734 |
| 8,379,101 B2* | 2/2013 | Mathe | G06K 9/00342 348/222.1 |
| 8,418,085 B2* | 4/2013 | Snook | G06F 3/017 715/707 |
| 9,916,009 B2* | 3/2018 | Zagorsek | G06F 3/017 |
| 2007/0279485 A1* | 12/2007 | Ohba | G06F 3/012 348/41 |
| 2008/0088587 A1* | 4/2008 | Pryor | H04N 9/3129 345/158 |
| 2008/0088588 A1* | 4/2008 | Kitaura | G06F 3/0304 345/158 |

* cited by examiner

IMAGE CAPTURING APPARATUS, TRACKING DEVICE, CONTROL METHOD, AND STORAGE MEDIUM

BACKGROUND OF THE INVENTION

Field of the Invention

The aspect of the embodiments relates to an image capturing apparatus and a tracking device, and particularly relates to object tracking.

Description of the Related Art

Some recent image capturing apparatuses employ a tracking technique for object tracking which is performed in such a manner that an area highly correlated with a predetermined object area is continuously detected and the detected area is kept tracked.

Further, some recently known image capturing apparatuses include a display having a touch panel.

Japanese Patent Application Laid-Open No. 2013-143578 discloses a technique in which a tracking target is selected by a user's touch operation on a touch panel while an object is being tracked, and tracking is continued.

In this technique, the following issue may occur. In a case where the image capturing apparatus erroneously sets, as a tracking target, an object different from an intended object which has been tracked by the user, the user attempts to re-designate the intended object by touching the object which is moving, by using the technique. However, if the user touches a position not on the intended object, an object other than the intended object ends up being designated and tracked.

SUMMARY OF THE INVENTION

According to an aspect of the embodiments, an image capturing apparatus includes a tracking unit configured to detect an area correlated with a tracking area corresponding to an object, a touch detection unit configured to detect a touch operation, a first detection unit configured to detect information corresponding to a distance to the object, a second detection unit configured to detect a movement of the object, a setting unit configured to set an area including a touch position where the touch operation is performed as an area from which the information corresponding to the distance to the object is detected, in accordance with a result of the detection by the second detection unit, and a calculation unit configured to calculate, for the area, a difference between the information corresponding to the detected distance to the object and information corresponding to a distance to an object that has previously been tracked, wherein the tracking unit is configured to set the tracking area based on a calculated result.

According to another aspect of the embodiments a tracking device includes a touch detection unit configured to detect a touch operation performed by a user on the screen, and, an area setting unit configured to set an area from which information corresponding to a distance to the predetermined target is detected, based on a touch position where the touch operation is performed on the screen, wherein the tracking unit is configured to calculate a difference between information corresponding to the distance to the predetermined target detected from the set area and information corresponding to a distance to an object in the first tracking area, and the tracking unit configured to perform control, in a case where the difference is smaller than a predetermined value, to set at least a part of the area as the second tracking area, and in a case where the difference is larger than the predetermined value, not to set the area as the second tracking area.

Further features of the disclosure will become apparent from the following description of exemplary embodiments with reference to the attached drawings.

DESCRIPTION OF THE EMBODIMENTS

Exemplary embodiments of the disclosure are described below with reference to the drawings.

[Configuration of Image Capturing Apparatus (FIG. 1)]

Figure 1:
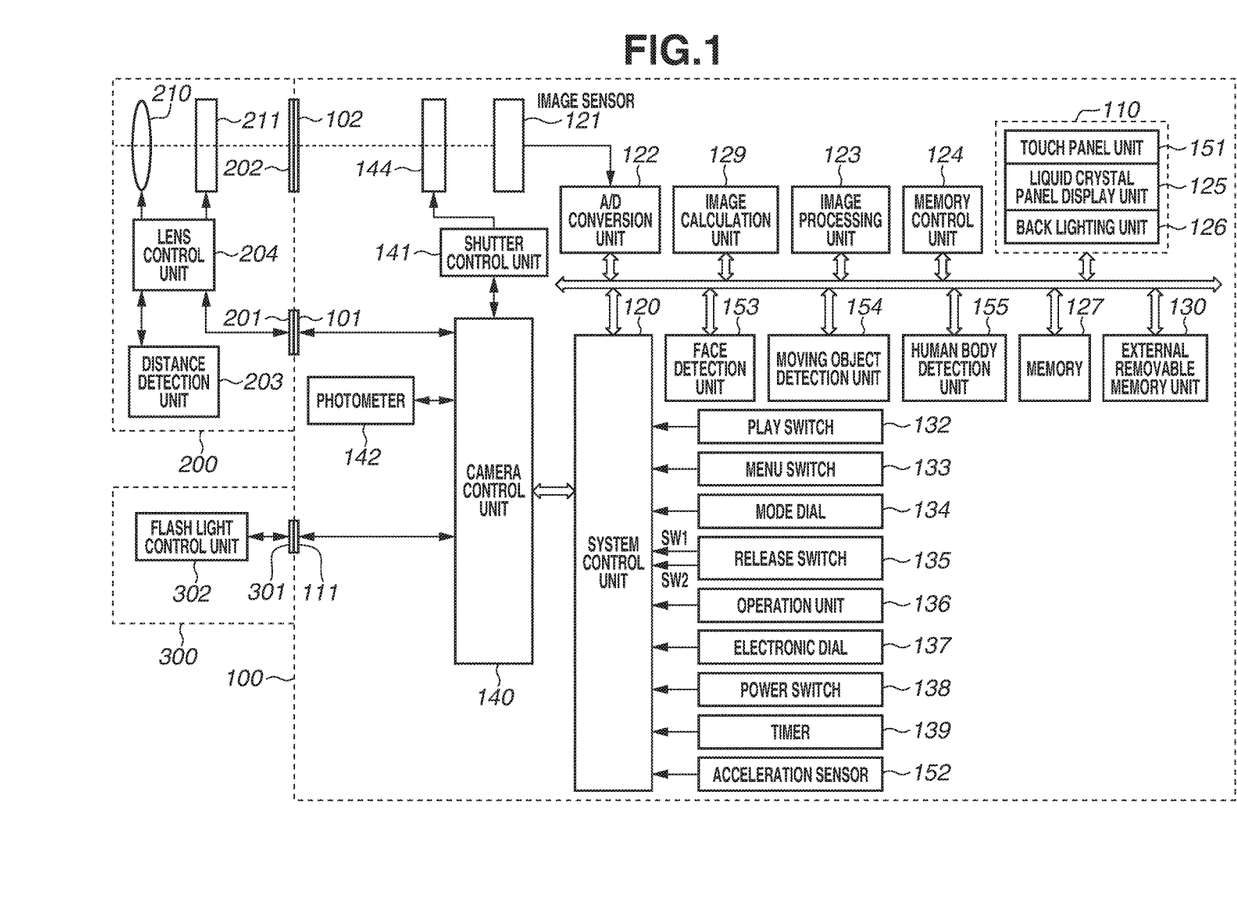
FIG. 1 is a block diagram illustrating an example of a configuration of an image capturing apparatus according to a first exemplary embodiment.

FIG. 1 is a block diagram illustrating a configuration of an image capturing apparatus 100 with an exchangeable lens unit, according to an exemplary embodiment of the disclosure. The image capturing apparatus 100 according to the present exemplary embodiment includes a display device 110 having a touch panel function.

An optical image of an object (not illustrated) that has passed through an imaging lens 210, a diaphragm 211, lens mounts 102 and 202, and a shutter 144 is formed on an image sensor 121. The image sensor 121 converts the optical image formed thereon into an electrical signal. As will be described below, the image sensor 121 according to the present exemplary embodiment can perform what is known imaging plane phase-difference focus detection.

An analog-to-digital (A/D) conversion unit 122 converts an analog signal output from the image sensor 121 into a digital signal. The digital signal obtained though the A/D conversion by the A/D conversion unit 122 is stored in a memory 127 under control performed by a memory control unit 124 and a system control unit 120.

An image processing unit 123 executes predetermined pixel interpolation processing and color conversion processing on data of the digital signal obtained though the A/D conversion by the A/D conversion unit 122 or data from the memory control unit 124.

An image calculation unit 129 performs the imaging plane phase-difference focus detection described above based on a plurality of pixel signals having parallax output from the image sensor 121. Thus, the image calculation unit 129 calculates a defocus amount of an image-forming plane from a predetermined focal plane (a shifted amount of an image having parallax) in an imaging optical system.

The image calculation unit 129 can also calculate a contrast value of a captured image and measure a focus state of the captured image from the calculated contrast value. Furthermore, the image calculation unit 129 can calculate a correlation value between image data stored in the memory 127 and a current captured image and search for a most highly correlated area.

The image calculation unit 129 can further automatically detect an object in a read image by executing template matching on the read image, by using a reference image as a tracking target image (template). By successive detection of an object highly correlated with a plurality of pieces of image data obtained from continuous image capturing, an object can be continuously tracked and position information on the object can be continuously output. An area which is a target to be tracked is referred to as a tracking area, an image of a tracking area is referred to as a tracking target image, and an object which is intended by the user to be a tracking target is referred to as a predetermined object. The object may be tracked using a similarity in a color histogram.

The memory control unit 124 controls data transaction among the A/D conversion unit 122, the image processing unit 123, the display device 110, an external removable memory unit 130, and the memory 127. The data from the A/D conversion unit 122 is written to the memory 127 via the image processing unit 123 and the memory control unit 124, or directly via the memory control unit 124.

The display device 110 is a liquid crystal display having a touch panel function, and includes a liquid crystal panel display unit 125, a backlighting unit 126, and a touch panel unit 151.

The liquid crystal panel display unit 125 can display a menu screen stored in an image display data area in the memory 127 and an image file stored in the external removable memory unit 130, in accordance with an instruction from the system control unit 120. Captured image data obtained from the image sensor 121 may be consecutively displayed in real time by through-image displaying, so that "Live View" shooting can be performed. During the Live View shooting, an auto focus (AF) frame representing an AF area may be displayed on an image on the display device 110 in an overlapping manner, so that the user can recognize the position of an AF target object.

The backlighting unit 126 illuminates the liquid crystal panel display unit 125 from the backside of the liquid crystal panel display unit 125. A light source element used for the backlighting includes a light emitting diode (LED), an organic electroluminescence (EL), and a fluorescent tube. The lighting can be appropriately turned ON and OFF in accordance with an instruction from the system control unit 120.

The touch detection method employed in the touch panel unit 151 is an electrostatic capacity method. In the present exemplary embodiment, the touch panel unit 151 can implement touch AF with which a user designates a position of an object as an AF target.

The system control unit 120 controls the entirety of the image capturing apparatus 100. The memory 127 stores therein data of a still image and a moving image that have been captured, as well as data of an image to be displayed. Thus, the memory 127 has a storage capacity large enough to store a predetermined number of still images and moving images. The memory 127 includes areas used by the system control unit 120. Such areas include a program stack area, a status storage area, a calculation area, a work area, and an image display data area. The system control unit 120 uses the calculation area of the memory 127 to execute various types of calculation. The memory 127 can further store therein results of focus detection and tracking described below.

The external removable memory unit 130 records and reads an image file to and from a recording medium, such as a compact flash (registered trademark) and a secure digital (SD) card.

The photometer 142 executes auto exposure (AE) processing. A light beam incident on the imaging lens 210 is guided to the photometer 142 via the diaphragm 211, the lens mounts 102 and 202, and a photometry lens (not illustrated) so that an exposure state of an image formed as an optical image can be measured. The photometer 142 can also cooperate with a flash light unit 300 to implement an electronic flash (EF) processing function. The flash light unit 300 also has a floodlight function and a flash light modulation function for an AF-assist light.

A camera control unit 140 controls a series of operations of a camera by communicating with a shutter control unit 141 and the photometer 142. The camera control unit 140 can also control a lens unit 200 and the flash light unit 300.

A play switch 132, a menu switch 133, a mode dial 134, a release switch 135, an operation unit 136, an electronic dial 137, and a power switch 138 are units (operation units) with which various operation instruction are input to the system control unit 120. The operation units include one or a plurality of combinations of a switch, a dial, pointing through viewpoint detection, a voice recognition device, and the like. The operation units are described in detail. The play switch 132 is used for a play/display mode operation for displaying predetermined image data on the display device 110. When an image file stored in the external removable memory unit 130 is played/displayed, the play switch 132 is operated. When the play switch 132 is operated during the play/display mode, the play/display mode can be changed to an image capturing mode.

The menu switch 133 is used for displaying a list of various items on the display device 110. The various items include a state setting related to image capturing, a format of a recording medium, a clock setting, a development parameter setting, and a user function setting (custom function setting).

The mode dial 134 is an operation unit for switching an image capturing mode.

The release switch 135 is turned on when a release button is half pressed (SW1) and fully pressed (SW2). In the half-pressed state, an instruction to start processing, such as AF processing, AE processing, auto-white balance (AWB) processing, and EF processing, is issued. In the fully-pressed state, image capturing processing of writing, to the memory 127, image data representing a signal read from the image sensor 121 via the A/D conversion unit 122 and the memory control unit 124, and development processing involving calculation in the image processing unit 123 and the memory control unit 124 are executed. Furthermore, an instruction to start a series of processing is issued. The series of processing includes reading image data from the memory 127, compressing the image data in the image processing unit 123, and writing the image data to a recording medium (not illustrated) attached to the external removable memory unit 130.

The operation unit 136 includes various buttons/switches and is used for various types of operations for an image capturing mode, a consecutive shooting mode, confirmation, a macro setting, page change, a flash setting, menu movement, white balance selection, captured image quality selection, exposure correction, and a date/time setting. The operation unit 136 further includes a switch for starting/stopping Live View shooting, switches for up, down, left, and right, a switch for changing a zoom ratio of a displayed image, a switch for turning ON/OFF image displaying, a switch for turning ON/OFF quick review which is for automatically displaying a captured image immediately after image capturing, and a switch for deleting the displayed image. The operation unit 136 further includes a compression mode switch for selecting a compression ratio for Joint Photographic Experts Group (JPEG) and Moving Picture Experts Group (MPEG) compression and selecting CCDRAW mode in which a signal from the image sensor is converted into a digital signal and recorded without image processing. Furthermore, the operation unit 136 includes an AF mode setting switch for setting a one-shot AF mode and a servo AF mode. In the one-shot AF mode, the focus state achieved by autofocus is maintained while the release button is half pressed. In the servo AF mode, the AF operation is continuously performed.

The electronic dial 137 is used for setting a shutter speed, an aperture value, exposure, and the like.

The power switch 138 is used for turning ON and OFF the image capturing apparatus 100. Furthermore, the power switch 138 may be further used for turning ON and OFF of various attached devices, such as the lens unit 200, the flash light unit 300, and a recording medium.

A timer 139 has a clock function, a calendar function, a timer counter function, and an alarm function, and is used for system management for setting a sleep shift time, alarm notification, and the like.

An acceleration sensor 152 can detect, as acceleration information, a posture and movement of the image capturing apparatus 100.

A face detection unit 153 can detect a position of a face in a captured image. The face detection can be performed through pattern matching between a captured image and template information on face data of, for example, eyes, a mouth, and a nose which are predetermined face features, to check the correlation level therebetween.

A moving object detection unit 154 can detect a movement of an object in a captured image. A motion vector component is extracted through comparison between an N-th frame image and an (N−1)th frame image of images captured in series. Only a motion vector component of an object can be detected by subtracting a motion vector component, which has been generated due to movement of the image capturing apparatus 100 and is detected by the acceleration sensor 152, from the extracted motion vector component. Motion vector components thus detected are grouped, and a group of motion vector components covering a predetermined area or more in the captured image is detected as a moving object. The moving speed of the detected moving object in the captured image can be calculated through comparison between the N-th frame image and the (N−1)th frame image.

A human body detection unit 155 can detect a position of a human body in a captured image. The human body detection unit 155 can detect a human body by performing pattern matching between a captured image and template information on predetermined feature points of a human body to check the correlation level therebetween, as similar in the processing of the face detection unit 153.

The lens mounts 102 and 202 are interfaces for mechanically connecting the lens unit 200 to the image capturing apparatus 100.

Connectors 101 and 201 electrically connect the lens unit 200 to the image capturing apparatus 100. The connectors 101 and 201 are controlled by the camera control unit 140.

Accessory shoes 111 and 301 are interfaces for electrically and mechanically connecting the flash light unit 300 to the image capturing apparatus 100.

The lens unit 200 can be detachably attached to the image capturing apparatus 100. The lens unit 200 can guide light from the imaging lens 210 via the diaphragm 211, the lens mounts 202 and 102, and the shutter 144 and can cause an optical image of an object (not illustrated) to be formed on the image sensor.

A lens control unit 204 controls the entirety of the lens unit 200. The lens control unit 204 has a function of serving as a memory to store therein a constant, a variable, and a program for performing operations. The lens control unit 204 also has a function of serving as a nonvolatile memory to store therein identification information, such as a number unique to the lens unit 200, management information, function information, such as maximum and minimum aperture values and a focal length, current and past setting values, and the like. The lens control unit 204 can perform an AF operation by controlling focusing of the imaging lens 210 to change an image-forming position of an object image incident on the image sensor 121, in accordance with a focus state of an image measured by a distance detection unit 203 or the image processing unit 123. The lens control unit 204 further has a function of controlling the diaphragm 211 and controlling zooming of the imaging lens 210.

A flash light control unit 302 controls the entire flash light unit 300. The flash light control unit 302 controls an amount and timing of light to be emitted from a light emitting unit (not illustrated), such as a xenon tube, based on information from the photometer 142.

[Configuration of Image Sensor (FIG. 2)]

Figure 2:
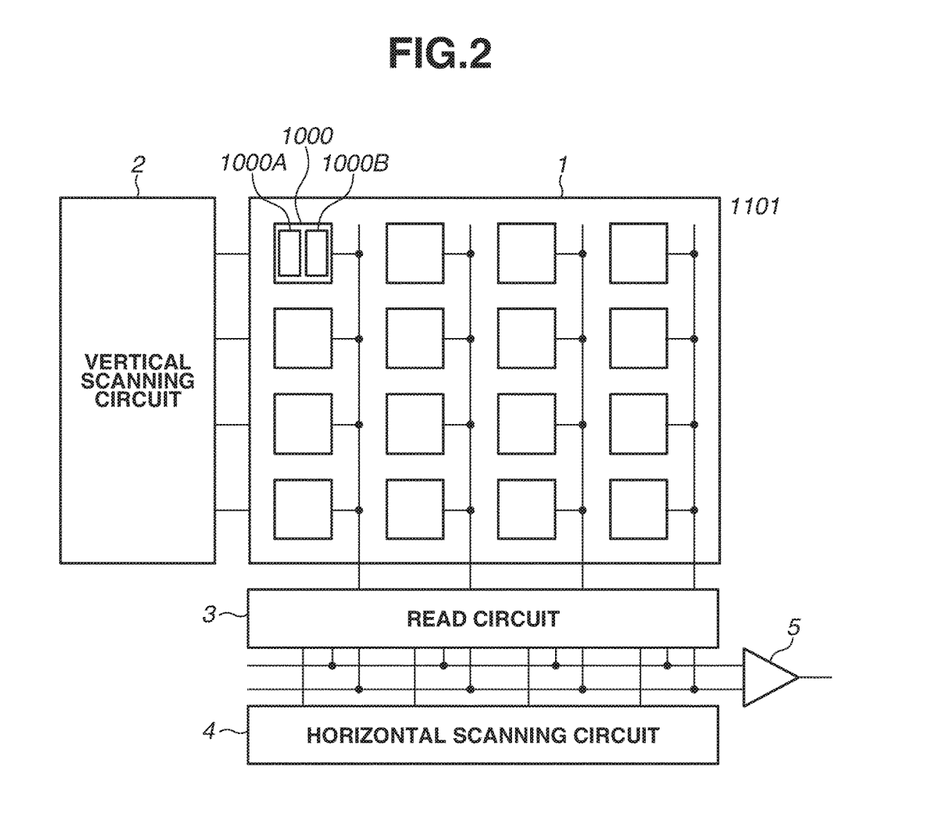
FIG. 2 is a block diagram illustrating an entire configuration of an image sensor according to the first exemplary embodiment.

Next, a configuration of the image sensor 121 is described with reference to FIG. 2. FIG. 2 is a diagram illustrating an entire configuration of the image sensor 121.

The image sensor 121 includes a pixel section area 1, a vertical scanning circuit 2, a read circuit 3, a horizontal scanning circuit 4, and an output amplifier 5. The pixel section area 1 includes a plurality of unit pixel sections 1000 arranged in a matrix. For simplifying the description, 16 pixels in a 4×4 matrix are illustrated in FIG. 2. However, millions of unit pixels or even more are arranged in a matrix in an actual configuration.

The unit pixel sections 1000 each include a photodiode 1000A and a photodiode 1000B. In front of each of the photodiodes 1000A and 1000B, a micro lens is provided. The micro lenses receive light beams (having parallax) each of which has passed through a different pupil area on an exit pupil of the imaging lens 210. Thus, the focus detection (imaging plane phase-difference focus detection) can be performed based on the phase difference between the signals from the photodiodes 1000A and 1000B. The principle of the phase-difference focus detection is described below. The number of photodiodes of the unit pixel section 1000 is not limited to two, and may be any number more than one.

The vertical scanning circuit 2 selects pixels in the pixel section area 1 on a row-by-row basis, and transmits a driving signal to the pixels in the selected row. The read circuit 3, including a column read circuit for each column, amplifies an output signal from the unit pixel section 1000, and samples and holds the resultant output signal. The horizontal scanning circuit 4 transmits a signal for causing the signals sampled and held by the read circuit 3 to be sequentially output to the output amplifier 5 on a column-by-column basis. The output amplifier 5 outputs the signal which has been output from the read circuit 3 according to the operation performed by the horizontal scanning circuit 4, to the A/D conversion unit 122.

[Basic Principle of Phase-Difference Focus Detection (FIG. 3)]

Figure 3A:
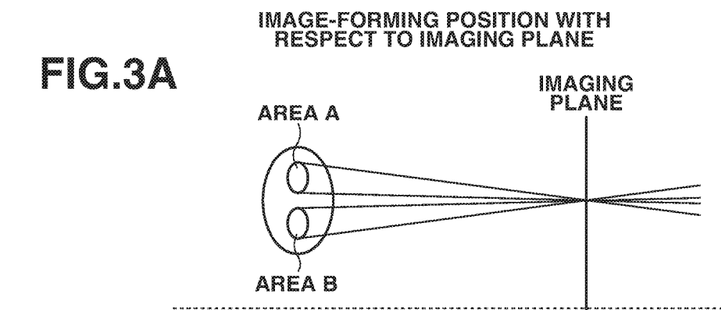
FIGS. 3A to 3F are diagrams illustrating a basic principle of autofocus (AF) based on phase-difference detection.
Figure 3B:
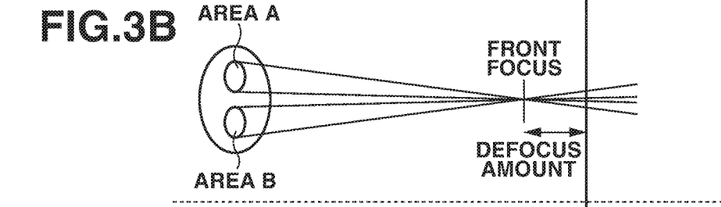
Figure 3C:
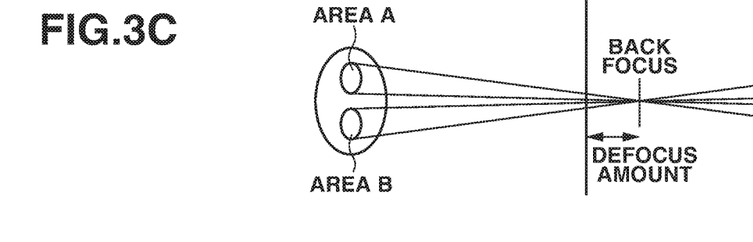
Figure 3D:
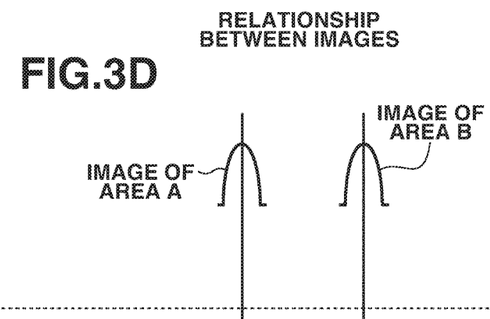
Figure 3E:
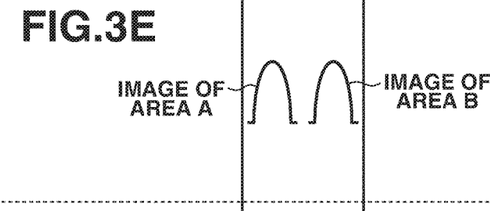
Figure 3F:
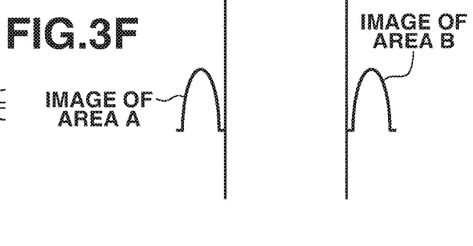

Next, the basic principle of the phase-difference focus detection is described with reference to FIG. 3A to 3F. FIGS. 3A, 3B, and 3C are diagrams each illustrating how an object image, entered through the imaging lens 210, is formed on the imaging plane. FIGS. 3D, 3E, and 3F are diagrams each illustrating a relationship between images formed on the image sensor 121. In FIGS. 3D, 3E, and 3F, axes corresponding to an image of an area A and an image of an area B are provided for the sake of description. Actually, these axes are the same.

In the phase-difference focus detection, light beams having parallax entered through the imaging lens 210 are used to generate two image signals that correspond to the light beams (having parallax). The defocusing amount is detected by measuring a distance between images of the two image signals. As illustrated in FIGS. 3A to 3C, the light beams which pass through the area A and the area B different from each other (but may partially overlapped with each other) have parallax.

A state, as illustrated in FIG. 3A, in which the light beam from the area A and the light beam from the area B overlap each other on the imaging plane is an focus state. An image is therefore appropriately in focus. In this state, as illustrated in FIG. 3D, a distance between two images which are an image of the area A and an image of the area B is an appropriate value.

Meanwhile, a state, as illustrated in FIG. 3B, in which a focal plane is in a position closer to the front side than the imaging plane (on a side of the imaging lens 210) is called as a front focus. In this state, as illustrated in FIG. 3E, the distance between the two images is smaller than the appropriate value.

Meanwhile, a state, as illustrated in FIG. 3C, in which the focal plane is in a position closer to the back side than the imaging plane (on a side opposite to the imaging lens 210) is called as a back focus. In this state, as illustrated in FIG. 3F, the distance between the two images is larger than the appropriate value.

In a case where focusing is performed using the AF, based on the distance between the focused two images, a focus state is determined as the front focus when the distance is small and is determined as the back focus state when the distance is large, and a movement direction of the imaging lens 210 is determined. Further, a movement amount of the imaging lens 210 is calculated based on a shifted amount of the image formed on the image sensor 121, and the imaging lens 210 is driven. This shifted amount is called as a defocus amount.

In the present exemplary embodiment, the phase-difference focus detection is used as an example. Alternatively, as described above, a contrast value of a captured image may be calculated, and the focus state of the captured image may be calculated based on the calculated contrast value.

[Main Flow (FIG. 4)]

Figure 4:
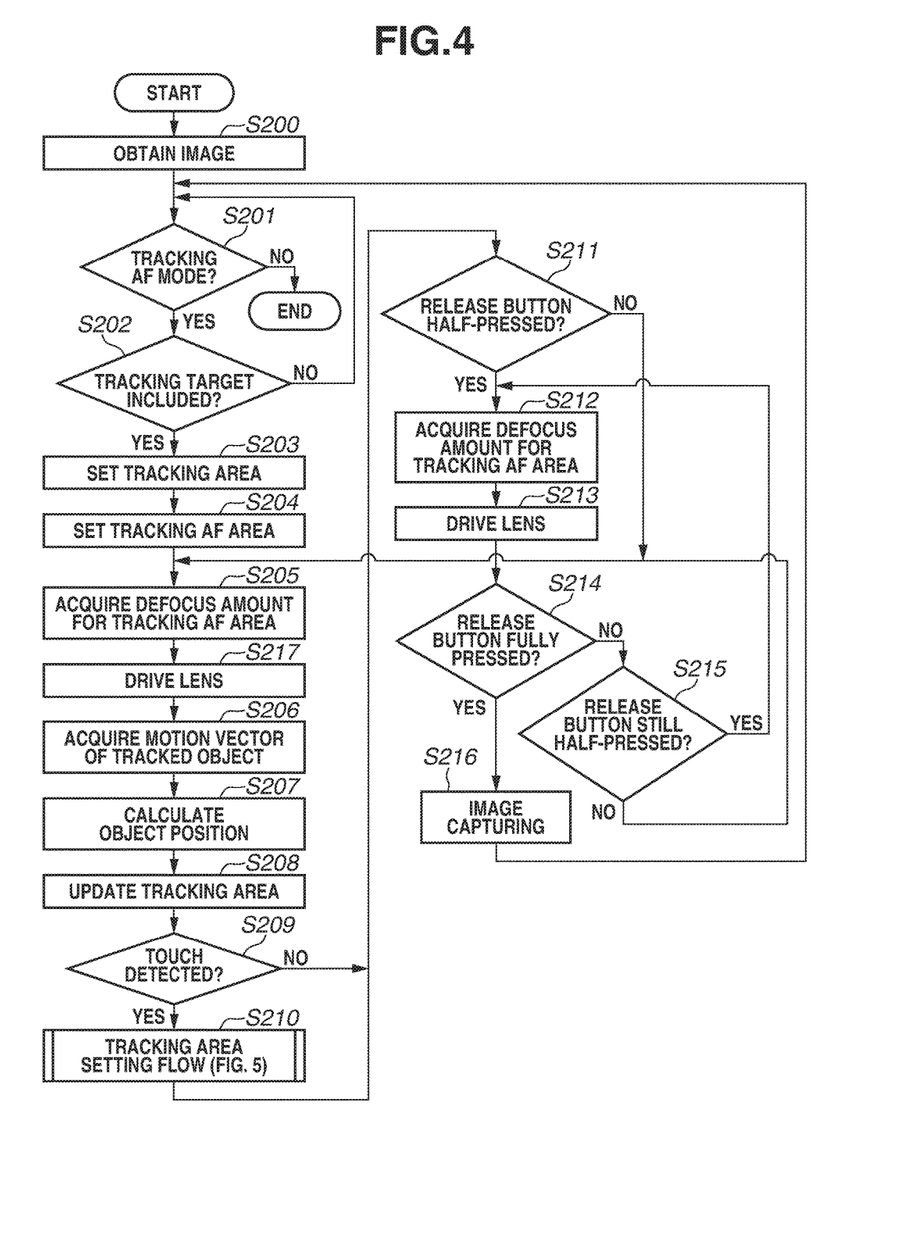
FIG. 4 is a flowchart illustrating processing executed in a tracking AF mode of the image capturing apparatus according to the first exemplary embodiment.

Image capturing processing in a tracking AF mode of the image capturing apparatus 100 according to the first exemplary embodiment is described below with reference to a flowchart illustrated in FIG. 4.

When the tracking AF mode is started, in step S200, the image capturing apparatus 100 obtains an image from the image sensor 121. The A/D conversion unit 122 converts an electrical signal, which has been output from the image sensor 121 after photoelectric conversion, into a digital signal. The converted digital signal is stored in the memory 127 under control performed by the memory control unit 124 and the system control unit 120.

In step S201, the system control unit 120 determines whether the currently selected image capturing mode is the tracking AF mode. In a case where the tracking AF mode is currently selected (YES in step S201), the processing proceeds to step S202. In a case where the tracking AF mode is not currently selected (NO in step S201), the processing is terminated.

In step S202, the system control unit 120 determines whether the image includes a tracking target in the tracking AF mode. For example, the system control unit 120 determines whether the image includes an object which is determined to be the tracking target object, based on information in the face detection unit 153, the human body detection unit 155, the moving object detection unit 154, and the memory 127. Examples of the tracking target object include a face, a human body, a moving body, and a previous tracking target. Alternatively, there is a case where an object which is determined to be the tracking target is designated in advance through a user operation. In a case where the image includes the tracking target (YES in step S202), the processing proceeds to step S203. In a case where the image includes no tracking target (NO in step S202), the processing returns to step S201. The processing in steps S201 and S202 is repeated until the tracking target is found in step S202, as long as the tracking AF mode is selected.

In step S203, the system control unit 120 sets a tracking area at a position of the tracking target in the image. The tracking area is an area of a tracking target as described above. As described above, the image calculation unit 129 tracks the object by using an image of the tracking area as the tracking target image (template) or by using a similarity in the color histogram. The processing proceeds to step S204 when the system control unit 120 sets the tracking area at the position of the tracking target in the image.

In step S204, the system control unit 120 sets a tracking AF area 501 at a position corresponding to the tracking area set in step S203. Thus, the tracking AF area 501 is an AF area which is set in accordance with the tracking area described above.

In step S205, the image calculation unit 129 calculates a defocus amount D_object for the tracking AF area 501 based on the information from the A/D conversion unit 122. When a defocus amount at a time point t=t1 is calculated, a defocus amount D_object(t=t1) is transmitted from the image calculation unit 129 to the memory 127 to be stored therein. The image calculation unit 129 calculates the defocus amount once in every predetermined time period, and each defocus amount thus calculated is stored in the memory 127. Information on a previous defocus amount stored in the memory 127 is not deleted every time the defocus amount is calculated, but is held for a predetermined period of time. For example, the defocus amount calculated for the tracking AF area 501 at time points t=t1, t2, . . . , and to may be held as defocus amounts D_object (t=t1), D_object (t=t2), . . . , and D_object (t=tn).

In step S217, the lens control unit 204 controls focusing of the imaging lens 210 based on the information (the defocus amount obtained in step S205) from the system control unit 120 to perform the AF operation.

In step S206, the system control unit 120 reads motion vector information of the object from the moving object detection unit 154. The motion vector information thus read is transmitted from the system control unit 120 to the memory 127 to be stored therein.

In step S207, the system control unit 120 calculates the position of the object based on the motion vector information stored in the memory 127 in step S206.

In step S208, the system control unit 120 updates the position of the tracking area based on the object position information calculated in step S207. In response to update of the position of the tracking AF area, the position of the tracking area is updated.

In step S209, the system control unit 120 determines whether the user has touched the touch panel unit 151 based on information from the touch panel unit 151. In a case where the touch operation is detected (YES in step S209), the processing proceeds to step S210. On the other hand, In a case where no touch operation is detected (NO in step S209), the processing proceeds to step S211.

Figure 6A:
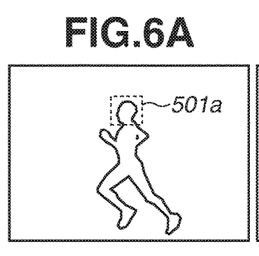
FIGS. 6A to 6J are diagrams for explaining differences in processing due to differences in a tracking AF frame, a touch position, an object movement direction, and an object speed.
Figure 6B:
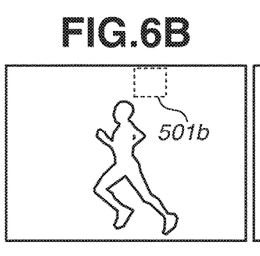
Figure 6C:
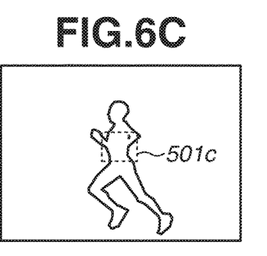

Examples where the touch operation is detected in step S209 include a case where the user touches the touch panel unit 151 to re-designate the object, because the tracking area corresponding to the tracking AF area 501a is set separate from the object. An ideal state is such a state that, as illustrated in FIG. 6A, the tracking area (not illustrated) is set at the position intended by the user (a face portion of the object in FIG. 6A) and the tracking AF area 501a is set at the corresponding position. However, depending on a moving speed of the object, there may be a case where, as illustrated in FIG. 6B, because the tracking area (not illustrated) is set at a position separate from the object, the corresponding tracking AF area 501b is set separate from the object. There also may be a case where, as illustrated in FIG. 6C, even though the tracking area (not illustrated) is set on the object and a tracking AF area 501c is therefore set on the object, the tracking AF area 501c is set separate from the position intended by the user. In the case illustrated in FIG. 6C, the tracking area (not illustrated) is not set at the face portion intended by the user but is set at a body portion. Thus, the tracking AF area 501c is also set at the body portion. In a case where, as the cases illustrated in FIGS. 6B and 6C, the tracking AF area (501b or 501c) corresponding to the tracking area (not illustrated) is set at a position separate from the position intended by the user, and the user therefore attempts to change the tracking area by a touch operation, the touch operation is detected in step S209.

Figure 5:
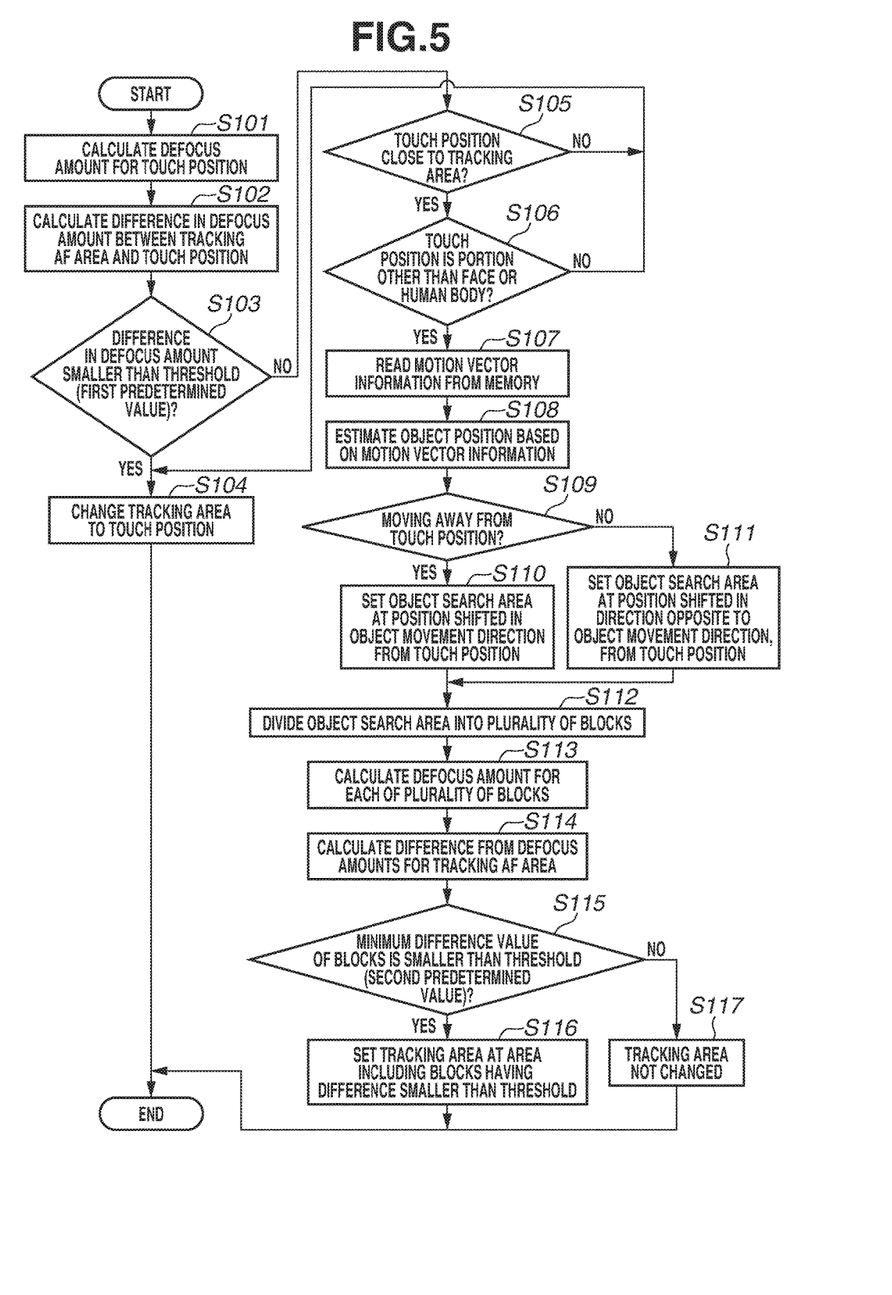
FIG. 5 is a flowchart illustrating processing of setting a tracking area, executed by the image capturing apparatus according to the first exemplary embodiment.

In step S210, the image capturing apparatus 100 sets the tracking area according to processing of a flowchart illustrated in FIG. 5 as described in detail below.

In step S211, the system control unit 120 determines whether the release button is half pressed, based on a signal output from the release switch 135. In a case where the release button is half pressed (YES in step S211), the processing proceeds to step S212. On the other hand, In a case where the release button is not half pressed (NO in step S211), the processing proceeds to step S205.

In step S212, the image calculation unit 129 calculates the defocus amount for the tracking AF area based on the signal from the A/D conversion unit 122.

In step S213, the lens control unit 204 controls the focusing of the imaging lens 210 based on the information (the defocus amount acquired in step S212) from the system control unit 120, to perform the AF operation.

In step S214, the system control unit 120 determines whether the release button is fully pressed, based on a signal output from the release switch 135. In a case where the release button is fully pressed (YES in step S214), the processing proceeds to step S216. On the other hand, in a case where the release button is not fully pressed (NO in step S214), the processing proceeds to step S215.

In step S215, the system control unit 120 determines whether the release button is still half pressed, based on a signal output from the release switch 135. In a case where the release button is still half pressed (YES in step S215), the processing returns to step S212. On the other hand, in a case where the release switch 135 is no longer half pressed (NO in step S215), the processing returns to step S205.

In step S216, the image capturing apparatus 100 drives the shutter 144, exposes the image sensor 121, and records a result of the image capturing operation in the external removable memory unit 130 by controlling the system control unit 120 and the camera control unit 140. When the image capturing is completed, the processing returns to step S201, and the processing in this flowchart is repeated until the tracking AF mode is terminated.

[Tracking Area Setting Flow (FIG. 5)]

Processing of setting the tracking area is described with reference to the flowchart in FIG. 5. The processing is executed in a case where the touch operation by the user is detected while the image capturing apparatus 100 according to the first exemplary embodiment is in the tracking AF mode.

In step S101, the image calculation unit 129 calculates the defocus amount for a touch position based on a signal which has been output from a pixel section on the image sensor 121 corresponding to the touch position and subjected to the A/D conversion in the A/D conversion unit 122.

In step S102, the system control unit 120 reads the defocus amount of the tracking target object which is calculated in step S205 and stored in the memory 127, and calculates a difference between the read defocus amount and the defocus amount of the touch position calculated in step S101, with the following formula:

$$\Delta D = |D\_\text{object}(t=ti) - D\_\text{touch}|,$$

where $D\_\text{object}(t=ti)$ represents the read defocus amount of the tracking AF area 501, $D\_\text{touch}$ represents the defocus amount of the touch position, and $\Delta D$ represents the difference in the defocus amounts.

There may be a case where the defocus amount of the tracking AF area 501 calculated in step S205 does not always coincide with the defocus amount of the tracking target object. This is because the object corresponding to the tracking AF area 501 might be changed to an object different from the tracking target object intended by the user due to a change in the position of the tracking area. More specifically, the defocus amount of the tracking AF area 501 and the focus amount of object do not coincide with each other in a case where the position of the tracking AF area 501 is changed as a result of deviation of the position of the tracking area from the intended tracking target object, as in a case of the change from the state illustrated in FIG. 6A to the state illustrated in FIG. 6B.

The tracking AF area 501a illustrated in FIG. 6A represents the tracking AF area 501 of a case where the object is successfully tracked with the tracking area. The tracking AF area 501b illustrated in FIG. 6B represents the tracking AF area 501 of a case where the tracking area is changed to a position different from the object which is intended by the user to be tracked.

The system control unit 120 may calculate a change in the defocus amount of the tracking AF area 501 over time, and in a case where a large change over time is detected, may read a previous defocus amount. For example, when t=tx is satisfied in the following formula;

$|d/dt\ D\_object(t)| > dth,$ where d/dt D_object(t) represents a time differentiation of D_object(t) and dth represents a threshold of the change over time, the system control unit 120 may read the defocus amount of a time point before t=tx from the memory 127. Thus, the defocus amount of the tracking AF area 501a before the tracking area is set separate from the object can be read.

[Determination on Whether User has Successfully Touched Object (S103)]

In step S103, the system control unit 120 determines whether the difference ΔD calculated in step S102 is smaller than the threshold ΔDth (first predetermined value) of difference. In a case where the object tracked by the tracking AF area 501 read from the memory 127 is the same as the object touched by the touch operation detected in step S209, the threshold ΔDth is set in such a manner that the difference ΔD of the defocus amounts becomes smaller than the threshold ΔDth of the difference.

In a case where the difference ΔD of the defocus amounts is smaller than the threshold ΔDth (smaller than the first predetermined value) (YES in step S103), the processing proceeds to step S104. On the other hand, in a case where the difference ΔD of the defocus amounts is equal to or larger than the threshold ΔDth (equal to or larger than the first predetermined value) (NO in step S103), the processing proceeds to step S105.

Figure 6D:
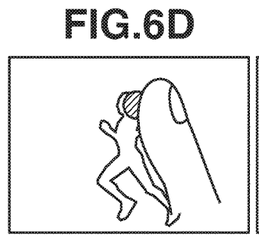

Examples of a case where the difference ΔD of the defocus amounts used in step S103 is equal to or larger than the threshold ΔDth and a case where the difference ΔD of the defocus amounts used in step S103 is smaller than the threshold ΔDth are described with reference to FIGS. 6D and 6E. FIG. 6D is a diagram illustrating a state where, when the user has performed the touch operation on the object, the user has correctly touched the object. In this case, the difference between the defocus amount D_object (t=ti) of the tracking AF area 501 read from the memory 127 and the defocus amount D_touch of the touch position is smaller than the threshold ΔDth. In the case where the difference ΔD is smaller than the threshold ΔDth of difference, the user has successfully touched the object that is the same as the object that has been tracked by the tracking area corresponding to the tracking AF area 501a. Thus, the user may want to change the tracking area to the touch position.

Figure 6E:
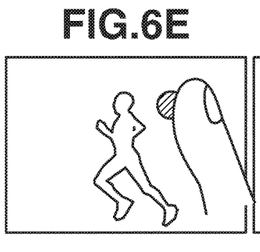

On the other hand, in a case, as illustrated in FIG. 6E, where the user has touched a position separate from the object, the difference ΔD becomes larger. If, in such a case, the tracking AF area is changed to the touch position, the object which is intended by the user to be tracked cannot be tracked. The processing in step S104 and after is described based on the description above.

In step S104, the system control unit 120 changes the tracking area to the touch position. It is because, in the case where the processing proceeds to step S104, the user highly likely touches the object position correctly, as described above. When the tracking area is set at the touch position, the system control unit 120 sets the tracking AF area 501 at the corresponding position.

Figure 6F:
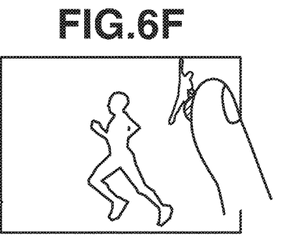

In a case where the result of the determination in step S103 is NO, the user has attempted to perform the touch operation on the moving object but has likely touched a position separate from the object erroneously. In such a case, the tracking area may be set at a position including the object and not at the touch position. FIG. 6F is a diagram illustrating another possible case. More specifically, the user might have performed the touch operation with an intention to set the tracking area at a second object different from the moving object. In such a case, the tracking area is intended to be set at the touch position. Processing in steps S105 and S106 is executed for determining whether the user is intended to set the tracking area at the second object.

[Determination on Whether User Intends to Set Tracking Area on Second Object (Steps S105 and S106)]

In step S105, the system control unit 120 calculates a distance between two points represented by coordinates at the touch position and coordinates at the tracking AF area 501a (or the coordinates at the corresponding tracking area), and determines whether the calculated value is smaller than a threshold (first distance). In a case where the distance is smaller than the threshold (shorter than the first distance) (YES in step S105), the processing proceeds to step S106. In a case where the distance is equal to or larger than the threshold (not equal to or longer than the first distance) (NO in step S105), it is determined that the user has touched the second object different from the moving object because the touch position is sufficiently far from the tracking AF area 501a (and the corresponding tracking area), and the processing proceeds to step S104.

In step S106, the system control unit 120 determines whether a portion corresponding to the touch position in the captured image is a face or a human body based on information in the face detection unit 153 and the human body detection unit. In a case where the touch position is a portion other than the face or the human body (YES in step S106), the processing proceeds to step S107. In a case where the touch position is the face or the human body (NO in step S106), it can be considered that the user has touched the face or the human body of the second object different from the moving object. Thus, the tracking area may be set at the touch position, and thus the processing proceeds to step S104.

Conditions for the determination in steps S105 and S106 may also include a change in the defocus amount corresponding to the touch position before and after the touch operation. For example, in a case where the user has attempted to touch the moving object but touches a position on a rear side in the movement direction of the object, the change in the defocus amount often becomes large before and after the touching. This is because, in terms of the defocus amount of the touch position, before the touching, the moving object is at a position to be touched, but after the touching, the moving object has already passed the touch position and an object that has been behind the moving object is present at the touch position. A distance between the image capturing apparatus 100 and the object that has appeared from behind the moving object is different from a distance between the image capturing apparatus 100 and the moving object. Thus, the defocus amount changes before and the after the touch operation. All things considered, in a case where the change in the defocus amount of the touch position is smaller than a threshold, the processing may return to step S104.

Processing in steps S107 to S115 is executed for searching for an object that has not been included in at the touch position. In a case where the processing proceeds to step S107, it means that the user has highly likely touched a position separate from the object position. Thus, a defocus amount is obtained for an area (a search area described below) that is likely to include the object using the touch position as a starting point. The obtained defocus amount is compared with the defocus amount D_object(t=ti) of the tracking AF area 501a. In a case where there is a portion in which a difference between a defocus amount of an area highly likely including the object and the defocus amount of the tracking AF area 501*a* becomes small, the portion is likely to represent the object. The processing in and after step S107 is described based on the description above.

[Setting Object Search Area (Steps S107 to S111)]

In step S107, the system control unit 120 (direction acquisition unit) reads information, on a motion vector of the object corresponding to the tracking AF area 501*a*, obtained in step S206 (FIG. 4) from the memory 127.

In step S108, the system control unit 120 (estimation unit) calculates the position of the object based the information on the motion vector read in step S107.

In step S109, the system control unit 120 (moving body determination unit) determines whether the object is moving away from or approaching the touch position, based on information on the movement direction of the object acquired in step S107, information on the object position calculated in step S108, and information on the touch position obtained from the touch panel unit 151. In a case where the system control unit 120 determines that the object is moving away from the touch position (YES in step S109), the processing proceeds to step S110. On the other hand, in a case where the system control unit 120 determines that the object is approaching (not moving away from) the touch position (NO in step S109), the processing proceeds to step S111.

The cases where the object is approaching and moving away from the touch position are described with reference to FIGS. 6G and 6H. The case where the user touches a position separate from the moving object includes the following two examples. More specifically, in one example, the user touches a position closer to the rear side than the object in the movement direction of the object (see FIG. 6G). In the other example, the user touches a position closer to the front side than the object (see FIG. 6H).

Figure 6G:
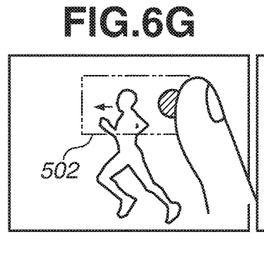

In a case where, as illustrated in FIG. 6G, the position closer to the rear side than the object has been touched, the object moves away from the touch position. In such a case, the object is at a position shifted in the movement direction of the object from the touch position. Thus, the object search area 502 is set to be wider on the side in the movement direction of the object than on the side in a direction opposite to the movement direction of the object, using the touch position as the starting point. The object search area is an area from which a defocus amount is obtained in step S113 described below. The obtained defocus amount is compared with the defocus amount D_object(t=ti) of the tracking AF area 501*a*, and the area with the small difference in the defocus amounts thus can be found as the area including the object.

Figure 6H:
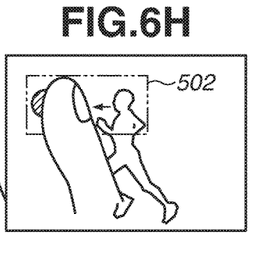

On the other hand, in a case where, as illustrated in FIG. 6H, the position closer to the front side than the object has been touched, the object approaches the touch position. In such a case, the object is at a position shifted in the direction opposite to the movement direction of the object from the touch position. Thus, the object search area 502 is set to be wider on the side in the direction opposite to the movement direction of the object than on the side in the movement direction of the object, using the touch position as the starting point. The area with the small difference in the defocus amounts thus can be found as the area including the object, similar to the case described above.

Figure 6I:
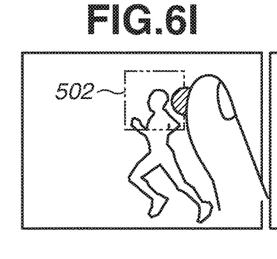
Figure 6J:
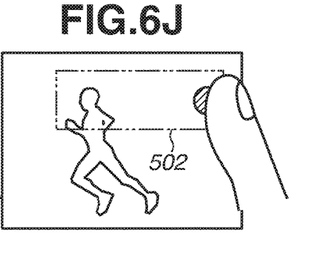

The size of the object search area 502 may be changeable in accordance with how the object moves. For example, the system control unit 120 may read the moving speed of the object (of the case illustrated in FIG. 6A) from the moving object detection unit 154 and change the size of the object search area 502 in accordance with the moving speed of the object. When the object moves at a faster speed, the user has more chance of touching a position largely separate from the object. Thus, for example, the object search area 502 of the case (for example, FIG. 6J) where the moving speed of the object is equal to or faster than a predetermined speed (first speed) is set to be larger than the object search area 502 of the case (for example, FIG. 6I) where the moving speed of the object is slower than the predetermined speed (first speed). Thus, even in a case where the object moves at a high speed, the object can be prevented from being not included in the object search area 502. The object thus can be found by the processing in step S114 which is executed later.

The size of the object search area 502 may further be changed in accordance with the size of the object and the size of the face of the object.

Furthermore, the object search area 502 may be changed in accordance with a touched area. In a case where the touched area is large, it can be considered that the user has roughly designated an area including the object by touching a large area, in order to designate an object difficult to designate with the touch operation due to its moving speed or type of movement. Thus, the object search area 502 is set larger for the case where a larger area has been touched, compared with the case where a smaller area has been touched. Thus, the object that is difficult to designate with the touch operation can be prevented from being not included in the object search area 502, and thus can be found by the processing in step S114.

In step S110, the system control unit 120 (area setting unit) sets the object search area 502 at a position shifted in the movement direction of the object from the touch position. As described above, in a case where the processing proceeds to step S110, it means that the object is likely to be at a position shifted in the movement direction of the object from the touch position. Thus, with this processing, the object can be easily found by the processing in step S114 executed later.

In step S111, the system control unit 120 sets the object search area 502 at a position shifted from the touch position toward the position of the object (in the direction opposite to the movement direction of the object). As described above, in a case where the processing proceeds to step S111, it means that the object is likely to be at a position shifted in the direction opposite to the movement direction of the object from the touch position. Thus, with this processing, the object can be easily found by the processing in step S114 executed later, similar to the case of step S110.

[Setting Object Search/Tracking Area (Steps S112 to S117)]

Figure 7:
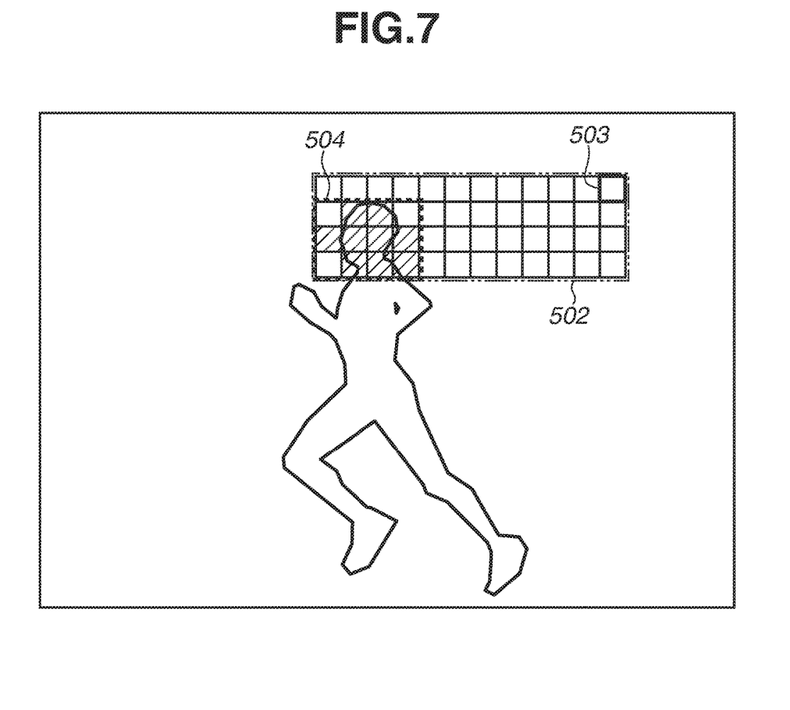
FIG. 7 is a diagram illustrating how an AF area is set according to the first exemplary embodiment.

In step S112, the system control unit 120 (dividing unit) divides the set object search area 502 into a plurality of blocks 503 (FIG. 7). This block division processing is executed for obtaining a defocus amount of each of the plurality of blocks 503, and for setting the tracking area at an area including the object in step S116 executed later. A single block may have a size corresponding to a single pixel section on the image sensor 121, or may have a size corresponding to tens to ten thousands of pixel sections to reduce an amount of calculation.

The size of a single block may be set in accordance with the size of the object search area 502 set in step S110 or S111. For example, the size of each block 503 may be set larger in a case where the object search area 502 is large, in order to reduce an amount of calculation, compared with a case where the object search area 502 is small.

The size of a single block may be set in accordance with the size of the object.

In step S113, the image calculation unit 129 (first detection unit) calculates the defocus amount for each block 503 set in step S112, based on the signal from the A/D conversion unit 122.

In step S114, the system control unit 120 (difference calculation unit) reads the defocus amount of the tracking target object which is stored in the memory 127 in step S205, and calculates a difference between the read defocus amount and the defocus amount of each block 503 calculated in step S113. The difference $\Delta D(j)$ of each block may be calculated with the flowing formula.:

$$\Delta D(j)=|D\_object(t=ti)-D\_block(j)|,$$

where D_object(t=ti) represents the read defocus amount of the tracking AF area 501a and D_block(j) represents the defocus amount of each block 503.

In step S115, the system control unit 120 detects the smallest one of the differences $\Delta D(j)$ of the defocus amounts of the plurality of blocks 503 calculated in step S114, as a minimum difference min$\Delta D(j)$. Then, the system control unit 120 determines whether the minimum difference value min$\Delta D(j)$ is smaller than the threshold $\Delta Dth$ (second predetermined value) of difference. In a case where the minimum difference value min$\Delta D(j)$ is smaller than the threshold $\Delta Dth$ (second predetermined value) (YES in step S115), the processing proceeds to step S116. In a case where the minimum difference value min$\Delta D(j)$ is equal to or larger than the threshold $\Delta Dth$ (second predetermined value) (that is, when none of the differences $\Delta D(j)$ exceeds the second predetermined value) (NO in step S115), the processing proceeds to step S117.

In step S116, the system control unit 120 sets the tracking area in a manner described below. A block having the difference $\Delta D(j)$ of the defocus amounts smaller than the threshold $\Delta Dth$ is detected. A group of the detected blocks is estimated as the object. A smallest area including all these blocks (hatched) as illustrated in FIG. 7 is referred as an estimated object area 504. The system control unit 120 sets the estimated object area 504 as the tracking area.

In step S117, the system control unit 120 does not change the tracking area from that corresponding to the tracking AF area 501b (or the tracking AF area 501c) (in a case of resetting, re-designation is performed). In a case where the processing proceeds to step S117, it means that the object is not found by the comparison of the differences in the defocus amounts for peripheral areas of the touch position. Meanwhile, since the results of the determinations are YES in both steps S105 and S106, the user is likely to have attempted to designate a moving object. In other words, the user has performed the touch operation for a moving object but has touched a wrong position. For example, as illustrated in FIG. 6C, in a case where the intended object is tracked but the tracking area (not illustrated) and the tracking AF area are set on the body that is not the portion intended by the user to be tracked, the user might have performed the touch operation for tracking the head but has ended up touching a wrong position. In this case, the tracking area corresponding to the tracking AF area 501c is expected to be closer to the object intended by the user than the touch position. Thus, the tracking area is not changed to that corresponding to the tracking AF area 501c (in a case of resetting, re-designation is performed).

In the processing in step S115, it is not necessary to detect the smallest one of the differences $\Delta D(j)$ of the defocus amounts of the plurality of blocks 503 calculated in step S114. For example, whether there is a block having the difference $\Delta D(j)$ that is smaller than the second predetermined value may be simply determined. In a case where there is such a block, then in step S116, the tracking area may be set at an area including a plurality of such blocks.

Effect of First Exemplary Embodiment

As described above, the present exemplary embodiment is for the case where a tracking target object is changed to a different object without an instruction from a user to the image capturing apparatus, while the object is being tracked. In such a case, the user may perform a touch operation to re-designate the intended object. However, if, as the processing in step S104, the tracking area is merely changed to the touch position, an area not intended by the user is set as the tracking area in a case where the position touched by the user is slightly separate from the intended object. According to the first exemplary embodiment, in a case where an object to be tracked is re-designated by a touch operation on the touch panel while tracking is in process, the object intended by the user can be tracked even if a position touched by the user is separate from the intended object.

In the present exemplary embodiment, the difference is obtained through the comparison between the defocus amounts in step S102 and step S114. Alternatively, the system control unit 120 may calculate the distance information based on the defocus amounts, and may compare pieces of the calculated distance information with each other. In such a case, the determinations in step S103 and step S115 are not affected by a condition, such as a position of the lens at the time when each defocus amount is obtained and thus can be performed more accurately.

A second exemplary embodiment is described. The second exemplary embodiment is different from the first exemplary embodiment only in step S117 in FIG. 5, and other points are the same as the first exemplary embodiment. The description on the processing in common is omitted.

In the second exemplary embodiment, step S317 (not illustrated) is executed instead of step S117. In step S317, processing that is similar to that in step S104 in FIG. 5 is executed. More specifically, the tracking area is changed to the touch position detected in step S209.

Processing similar to that in the first exemplary embodiment is also executed in steps S105 and S106 in the second exemplary embodiment. Thus, in a case where the result of determination in either steps S105 and S106 is NO, it is determined that the second object is selected by the user, and the processing proceeds to step S104. However, there may be a case where the user has selected the second object even if the results of determinations in both steps S105 and S106 are YES. Examples of such a case include a case where the second object is separated from the tracking AF area (a) (or the corresponding tracking area) by a predetermined distance or more, and the second object is an animal and not a human. Even in such a case, the tracking area can be set based on the intension of the user to newly designate the second object, through the processing described above in step S317.

As described above, according to the present exemplary embodiment, in a case where the user re-designates an object to be tracked by touching the touch panel while tracking is in process, the object intended by the user can be tracked even if the user has touched a position not including the object.

It is to be noted that the disclosure is not limited to the exemplary embodiments of the disclosure described above, and may be changed and modified in various ways without departing from the gist of the disclosure.

According to the aspect of the embodiments, in a case where the user re-designates an object to be tracked by touching the touch panel while tracking is in process, the object intended by the user can be tracked even if the user has touched a position not including the object.

Other Embodiments

In the first exemplary embodiment and the second exemplary embodiment, in a case where the imaging plane phase-difference focus detection is performed based on a signal obtained from the image sensor 121, a contrast value of a captured image is calculated and a focus state of the captured image is detected based on the calculated contrast value. Alternatively, in the first exemplary embodiment and the second exemplary embodiment, phase-difference focus detection may be performed based on a signal obtained from a known focus detection unit that includes a line sensor and an area sensor for acquiring the signal for the focus detection, and is provided separately from the image sensor 121.

The aspect of the embodiments can be applied not only to an image capturing apparatus but also to a tracking device. The tracking device acquires, in a system in which object distance information and a defocus amount are additionally recorded for each portion in an image while image recording is in process, the object distance information and the defocus amount while the image is being displayed. Thus, a predetermined target in the displayed image is tracked based on the object distance information.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-023892, filed Feb. 10, 2016, which is hereby incorporated by reference herein in its entirety.

What is claimed is:

1. An image capturing apparatus comprising:
   a tracking unit configured to detect an area correlated with a tracking area corresponding to an object;
   a touch detection unit configured to detect a touch operation;
   a first detection unit configured to detect information corresponding to a distance to the object;
   a second detection unit configured to detect a movement of the object;
   a setting unit configured to set an area including a touch position where the touch operation is performed as an area from which the information corresponding to the distance to the object is detected, in accordance with a result of the detection by the second detection unit; and
   a calculation unit configured to calculate, for the area, a difference between the information corresponding to the detected distance to the object and information corresponding to a distance to an object that has previously been tracked,
   wherein the tracking unit is configured to set the tracking area based on a calculated result.

2. The image capturing apparatus according to claim 1, further comprising:
   a dividing unit configured to divide the set area into a plurality of blocks; and
   a comparison unit configured to compare, for each of the plurality of blocks, a difference between the information corresponding to the detected distance to the object and the information corresponding to the distance to the object that has previously been tracked with a first predetermined value,
   wherein in a case where a result of the comparison performed by the comparison unit indicates that the plurality of blocks includes a block having the difference smaller than a second predetermined value, the tracking unit is configured to set, as the tracking area, an area including the block having the difference, smaller than the second predetermined value, between the information corresponding to the detected distance to the object and the information corresponding to the distance to the object that has previously been tracked.

3. The image capturing apparatus according to claim 2, wherein in a case where the plurality of blocks does not include the block having the difference, smaller than the first predetermined value, between the information corresponding to the detected distance to the object and the information corresponding to the distance to the object that has previously been tracked, the tracking unit is configured not to change the tracking area.

4. The image capturing apparatus according to claim 3, wherein the tracking unit is configured to set, as the tracking area, a tracking area set before the touch operation is detected.

5. The image capturing apparatus according to claim 2, wherein in a case where the plurality of blocks does not include the block having the difference, smaller than the first predetermined value, between the information corresponding to the detected distance to the object and the information corresponding to the distance to the object that has previously been tracked, the tracking unit is configured to set, as the tracking area, a tracking area set before the touch operation is detected.

6. The image capturing apparatus according to claim 2, wherein in a case where the plurality of blocks does not include the block having the difference, smaller than the first predetermined value, between the information corresponding to the detected distance to the object and the information corresponding to the distance to the object that has previously been tracked, the tracking unit is configured to set, as the tracking area, an area in which the touch operation is detected.

7. The image capturing apparatus according to claim 1, further comprising:
a determination unit configured to determine whether the object is moving away from the touch position where the touch operation is performed,
wherein the second detection unit is configured to obtain vector information of the object,
wherein the determination unit is configured to determine whether the object is moving away from the touch position where the touch operation is performed based on the motion vector information of an object that has previously been tracked,
wherein in a case where the determination unit determines that the object is moving away from the touch position, the area setting unit is configured to cause the area to be set wider in a movement direction of the object than in a direction opposite to the movement direction of the object using the touch position as a starting point, and
wherein in a case where the object is not moving away from the touch position, the area setting unit is configured to cause the area to be set wider in the direction opposite to the movement direction of the object than in the movement direction of the object using the touch position as the starting point.

8. The image capturing apparatus according to claim 1, wherein the second detection unit is configured to detect a moving speed of the object, and
wherein in a case where the moving speed of the object is equal to or higher than a first predetermined speed, the area setting unit is configured to cause the area to be set larger than an area to be set for a case where the moving speed is lower than the first predetermined speed.

9. The image capturing apparatus according to claim 1, wherein the information corresponding to the distance to the object is a defocus amount.

10. The image capturing apparatus according to claim 1, wherein the information corresponding to the distance to the object is information of a distance to the object from the apparatus.

11. The image capturing apparatus according to claim 10, wherein the first detection unit is configured to detect the distance to the object based on a defocus amount.

12. A control method for an image capturing apparatus, the control method comprising:
tracking by detecting an area correlated with a tracking area corresponding to an object;
detecting a touch operation;
detecting, as first detecting, information corresponding to a distance to the object;
detecting, as second detecting, a movement of the object;
setting an area including a touch position where the touch operation is performed as an area from which the information corresponding to the distance to the object is detected, in accordance with a result of the second detecting; and
calculating, for the area, a difference between the information corresponding to the detected distance to the object and information corresponding to a distance to an object that has previously been tracked,
wherein in the tracking, the tracking area is set based on a result of the calculating.

13. A non-transitory computer-readable storage medium storing therein a computer-readable program for executing a control method for an apparatus, the program causing a computer to execute:
tracking by detecting an area correlated with a tracking area corresponding to an object;
detecting a touch operation;
detecting, as first detecting, information corresponding to a distance to the object;
detecting, as second detecting, a movement of the object;
setting an area including a touch position where the touch operation is performed as an area from which the information corresponding to the distance to the object is detected, in accordance with a result of the second detecting; and
calculating, for the area, a difference between the information corresponding to the detected distance to the object and information corresponding to a distance to an object that has previously been tracked,
wherein in the tracking, the tracking area is set based on a result of the calculating.

14. A tracking device comprising:
a tracking unit configured to set an area correlated to a first tracking area in a screen as a second tracking area to track a predetermined target;
a touch detection unit configured to detect a touch operation performed on the screen; and
an area setting unit configured to set an area from which information corresponding to a distance to the predetermined target is detected, based on a touch position where the touch operation is performed on the screen,
wherein the tracking unit is configured to calculate a difference between information corresponding to the distance to the predetermined target detected from the set area and information corresponding to a distance to an object in the first tracking area, and the tracking unit configured to perform control, in a case where the difference is smaller than a predetermined value, to set at least a part of the area as the second tracking area, and in a case where the difference is equal to or larger than the predetermined value, not to set the area as the second tracking area.

15. The tracking device according to claim 14, wherein the information corresponding to the distance to the object is information additionally recorded for each portion in an image.

16. The tracking device according to claim 14, wherein the information corresponding to the distance to the object is a defocus amount.

17. The tracking device according to claim 14, wherein the information corresponding to the distance to the object is information of a distance to the object from an apparatus.

18. The tracking device according to claim 17 further comprising a first detection unit configured to detect the information corresponding to the distance to the object.

19. A control method for a tracking device, the control method including:
tracking by setting an area correlated to a first tracking area in a screen as a second tracking area to track a predetermined target;
detecting a touch operation performed on the screen; and
setting an area from which information corresponding to a distance to the predetermined target is detected, based on a touch position where the touch operation is performed on the screen,
wherein in the tracking, a difference between information corresponding to the distance to the predetermined target detected from the area set in the setting and information corresponding to a distance to an object in the first tracking area is calculated, and control is performed such that in a case where the difference is smaller than a predetermined value, at least a part of the area is set as the second tracking area, and in a case where the difference is equal to or larger than the predetermined value, the area is not set as the second tracking area.

20. A non-transitory computer-readable storage medium storing therein a computer-readable program for executing a control method for a tracking device, the program causing a computer to execute:

tracking, by setting, an area correlated to a first tracking area in a screen as a second tracking area to track a predetermined target;

detecting a touch operation performed on the screen; and setting an area from which information corresponding to a distance to the predetermined target is detected, based on a touch position where the touch operation is performed on the screen, wherein in the tracking, a difference between information corresponding to the distance to the predetermined target detected from the area set in the setting and information corresponding to a distance to an object in the first tracking area is calculated, and control is performed such that in a case where the difference is smaller than a predetermined value, at least a part of the area is set as the second tracking area, and in a case where the difference is equal to or larger than the predetermined value, the area is not set as the second tracking area.

* * * * *